United States Patent [19]

Wilkins

[11] Patent Number: 4,977,866

[45] Date of Patent: Dec. 18, 1990

[54] FLOW CONTROL SYSTEM FOR INTAKE MANIFOLD

[76] Inventor: Don Wilkins, 218 6th NE., Cut Bank, Mont. 59427

[21] Appl. No.: 496,880

[22] Filed: Mar. 21, 1990

[51] Int. Cl.$^5$ .......................................... F02M 35/10
[52] U.S. Cl. .................. 123/52 MV; 123/403
[58] Field of Search ......... 123/52 M, 52 MB, 52 MV, 123/52 MC, 52 MF, 403

[56] References Cited

U.S. PATENT DOCUMENTS

| | | | |
|---|---|---|---|
| 1,893,502 | 1/1933 | Kuehn | 123/52 |
| 2,835,235 | 5/1958 | Gassmann | 123/52 |
| 3,875,918 | 4/1975 | Loynd | 123/188 |
| 4,210,107 | 7/1980 | Shaffer | 123/52 M |
| 4,274,368 | 6/1981 | Shaffer | 123/52 MV |
| 4,465,035 | 8/1984 | Carr | 123/188 |
| 4,553,507 | 11/1985 | Shaffer | 123/432 |
| 4,565,166 | 1/1986 | Takeda | 123/389 |
| 4,625,687 | 12/1986 | Hatamura et al. | 123/432 |
| 4,704,996 | 11/1987 | Morikawa | 123/188 |
| 4,759,320 | 7/1988 | Fujii et al. | 123/52 MB |
| 4,805,573 | 2/1989 | Macfarlane et al. | 123/52 M |
| 4,858,567 | 8/1989 | Knapp | 123/52 M |

FOREIGN PATENT DOCUMENTS

| | | | |
|---|---|---|---|
| 0013768 | 1/1987 | Japan | 123/52 M |
| 0018134 | 1/1988 | Japan | 123/52 M |

Primary Examiner—David A. Okonsky
Attorney, Agent, or Firm—Harry M. Cross, Jr.

[57] ABSTRACT

A movable wall member is mounted in the intake runner of an internal combustion engine manifold and connected to an actuator plate in the manifold plenum which moves the wall member in a longitudinal direction to increase the effective runner length. A rigid link or end panel is pivotally connected to the other end of the wall member and to the associated runner wall so that longitudinal movement of the wall member results in simultaneous transverse movement thereby reducing the effective cross-sectional flow area of the runner passage. The movable wall members of multiple runner passages are connected to a common actuator plate in the manifold plenum which reduces the effective plenum volume upon displacement of the actuator plate. Movement of the actuator may be controlled as a function of variations in intake manifold vacuum pressure so as to simultaneously decrease the effective runner cross-sectional flow area and plenum volume and to increase the effective runner length upon increased manifold vacuum pressure.

8 Claims, 3 Drawing Sheets

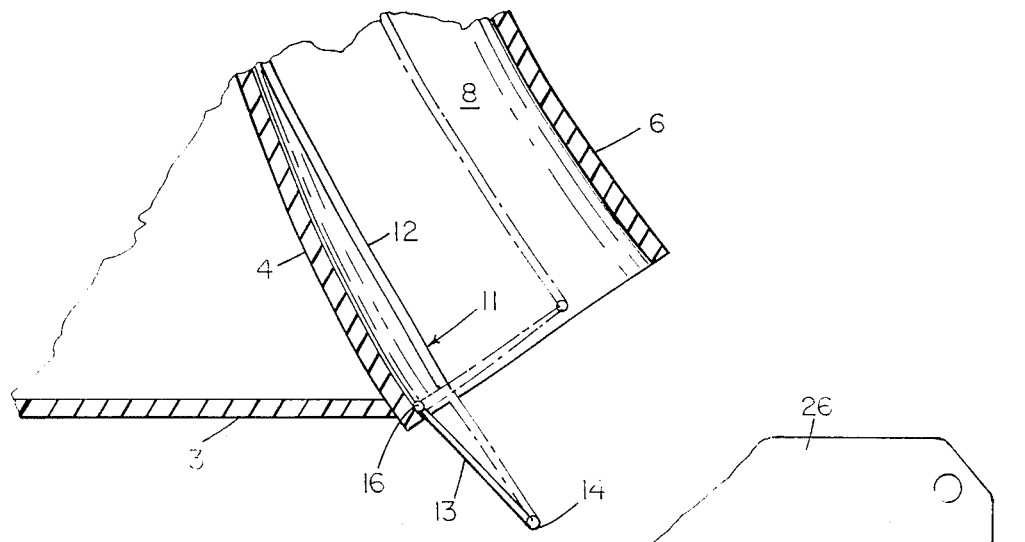
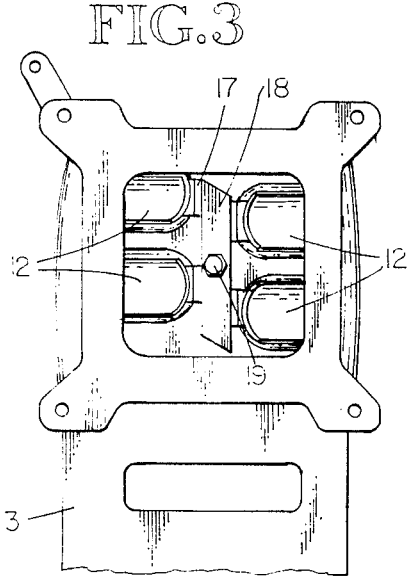
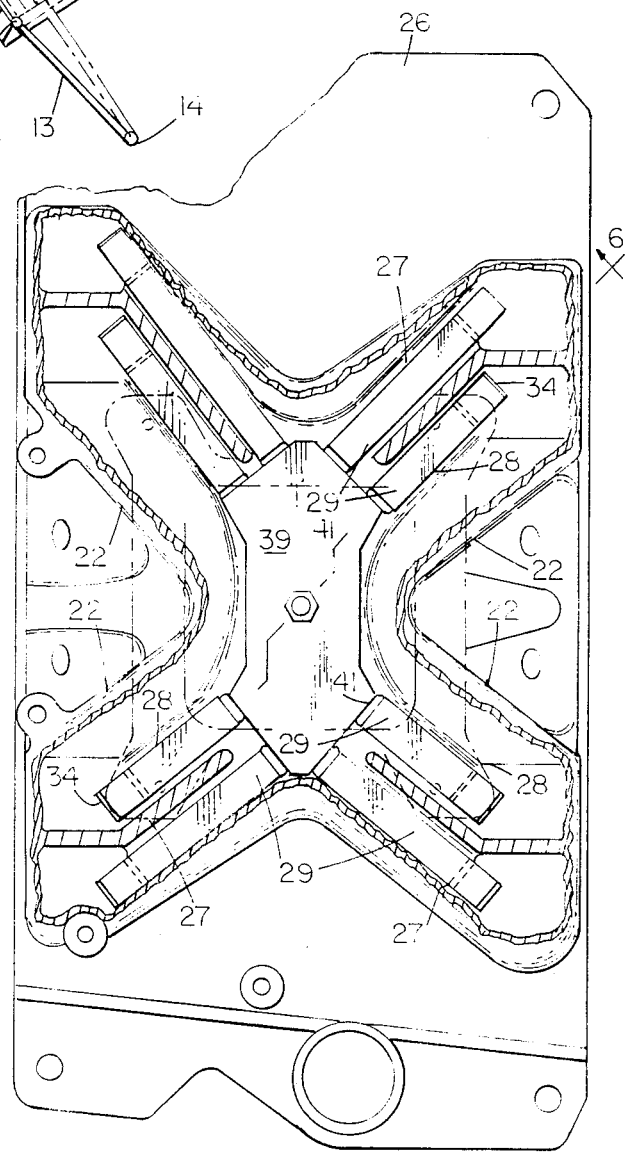

FLOW CONTROL SYSTEM FOR INTAKE MANIFOLD

BACKGROUND OF THE INVENTION

1. Field of the Invention

The present invention relates to a control system for the intake manifold of internal combustion engines and more particularly to a system for automatically controlling the velocity of the air-fuel mixture responsive to certain engine operation parameters. According to the present invention the length and effective cross-sectional area of the manifold runner as well as the effective plenum volume may be automatically adjusted during engine operation as a function of either the vacuum pressure level within the cylinders of the engine or engine speed. The object, of course, being to increase the velocity of the air-fuel mixture during periods of low rpms or low engine speed in order to ensure smoother and more efficient operation of the engine in terms of power and economy at lower rpms.

As will be appreciated by those skilled in the art, the intake manifold systems of internal combustion engines for passenger cars and commercial vehicles are generally designed for maximum efficiency at high or high medium engine speeds. This is a design compromise since the cross-sectional area of the intake manifold is normally fixed with no provision for adjusting the velocity of the air-fuel mixture flow at low-medium or low speeds. Consequently, most engines are markedly inefficient in terms of power and fuel consumption at low speed operation. As is also well known, the vacuum pressure within the cylinders of the engine and thus the intake manifold is inversely proportional to the speed or rpm of the engine, thus at low rpms the vacuum pressure is increased and decreases as the rpms increase. With a fixed cross-section manifold the velocity of the air-fuel mixture is thus normally decreased at low rpms. With the present invention, the length of the manifold runner and the effective cross-sectional area of the manifold runner as well as the volume of the plenum area are decreased during the high vacuum or low rpm operation. The velocity of the air-fuel mixture is thus increased so as to improve the engine operation efficiency.

2. Discussion of the Prior Art

The above discussed problems with fixed cross-section manifold runners has been long appreciated in the art and many attempts have been made to compensate for the air-fuel mixture velocity decrease during the period of high vacuum in the manifold and/or to otherwise control the mixture in the intake passages. The U.S. Patents to Loynd and Shaffer, U.S. Pat. Nos. 3,875,918 and 4,210,107 respectively are examples of devices having means for decreasing the cross-sectional area of manifold runners responsive to high vacuum pressure. The Shaffer (107) patent provides each individual fixed cross-section runner with a movable side plate controlled individually either manually or by its own vacuum motor. The movable plates of Shaffer are spring biased away from the fixed runner wall and vacuum pressure, electically or manually operated to the retracted position. The plates are mounted in and affect only one runner and hence actuators must be provided at the location of each runner. Because of the mechanics of the arrangement, the plates are limited both in their range of movement and by their ability to control only the cross-sectional area of the runners themselves. There is no control of runner length or plenum volume. the need for individual control of each runner plate also presents problems of complexity.

The Loynd patent utilizes a flexible rubber or plastic pipe section in the intake runner which assumes a restricted flow (reduced cross-section) configuration responsive to increased vacuum pressure. Although these devices provide control of the air-fuel mixture velocity, certain inherent deficiencies are present. The durability and reliability of materials such as rubber and plastics for instance are not satisfactory with extended use under engine operating conditions.

The U.S. patents to Carr and Shaffer, U.S. Pat. Nos. 4,465,035 and 4,553,507 respectively show still further examples of devices used to control the velocity of the air-fuel mixture to the cylinder intake ports. The Carr patent illustrates a form of slider valve for restricting the air flow and for imparting vortex flow at low engine speeds. Shaffer (507) provides a system of removable runner dividers with the capacity to increase or decrease the number of intake passages and hence the volume and velocity of flow to each cylinder as a solution to the common problem.

Still other approaches involve the expedient of adjusting the length of the intake manifold runner as a means to control velocity and volume of air-fuel mixture flow to the cylinders. The Gassmann U.S. Pat. No. 2,835,235 utilizes an annular intake conduit which is peripherally extended or shortened depending upon engine speed. Takeda U.S. Pat. No. 4,565,166 on the other hand utilizes an additional air intake pipe which may be selectively added to the normal intake pipe to increase the total intake runner length to obtain increased volumetric efficiency.

Another approach known to the prior art is illustrated by the Hatamura et al. U.S. Pat. No. 4,625,687 wherein the combustion chamber is provided with multiple intake ports and intake valves for controlling the supply of air-fuel mixture to the cylinders. In addition, the use of vacuum or engine speed controlled deflector plates, such as shown by the Morikawa and Knapp U.S. Pat. Nos. 4,704,996 and 4,858,567 respectively, are well known in the art. These devices are usually utilized to obtain flow characteristics such as swirl ratio or rotating flow to tailor the air-fuel mixture according to combustion parameters. Finally, the Kuehn U.S. Pat. No. 1,893,502 shows an early effort to control engine efficiency at different speeds by means of controlling the vacuum pressure in the intake manifold. This device or system was an attempt to keep the vacuum pressure in the manifold, and hence the velocity of air-fuel mixture, "balanced."

SUMMARY OF THE INVENTION

The present invention provides an improved system of air-fuel mixture flow control and volumetric efficiency for reciprocating piston internal combustion engines having one or more cylinders of in-line, "V" or opposed cylinder configurations. The apparatus and system has universal application in all internal combustion engines, including diesel and gasoline fueled. The device can be used with 2-stroke or 4-stroke engines and various types of fuel systems, including carburetor systems and fuel injected systems, including electronic fuel injectors. The mechanics of the device permit a simultaneous and uniform wide range adjustment of not only the cross-sectional area of the plurality of manifold runners of the multi-cylinder engine but also the effective runner length. In manifold designs commonly known as plenum-ram type, wherein a common plenum area is connected to a plurality of runners, the plenum volume is also adjusted as an additional means of air-fuel mixture velocity control. The device may be adapted to be operated directly responsive to manifold or cylinder vacuum pressure or under computer control responsive to vacuum pressure or engine speed. The apparatus provides a movable panel in each of multiple runners with a common operator located in the plenum area of the manifold. The movable panels are so constructed as to not only control the effective cross-sectional area of the runner but also the length of each runner upon operation.

The advantages flowing from the present system of volume and velocity control of the air-fuel mixture have been proven under actual engine operating conditions. Beneficial results are realized in the manner of smoother, more efficient operation of the engine fuel system and power and economy are both improved.

BRIEF DESCRIPTION OF THE DRAWINGS

Reference is made to the accompanying drawings illustrating the preferred embodiments wherein;

FIG. 3 is a plan view taken along lines 3—3 of FIG. 2;

FIG. 4 is a cross-sectional detail of one area of the FIG. 2 illustration taken at the location indicated in FIG. 2;

FIG. 5 is a plan view of a second embodiment adapted from installation in a plenum-ram type manifold for a 4 cylinder engine.

DESCRIPTION OF THE PREFERRED EMBODIMENTS

Figure 1:
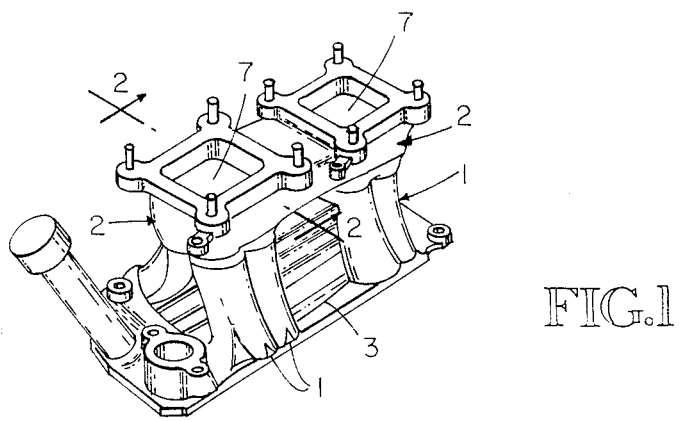
FIG. 1 is a perspective view of a plenum-ram type manifold for a V-8 engine employing two carburetors.

Although the present embodiments of the invention are illustrated and described in the environment of plenum-ram type manifold structures it will be understood that, in its broadest sense, the invention is not limited to any plenum or runner configuration. With modification the flow control system of the invention may in fact be adapted for use in any intake runner or pipe for a combustion chamber. FIG. 1 illustrates one common dual carburetor manifold system for a V-8 engine which basically includes eight separate runners 1, four each of which are connected respectively to an intake plenum 2. The two sets of four runners and their associated plenum are substantially identical mirror images and only one set will be described in detail to facilitate understanding of the flow control system of the invention. The manifold base 3 is designed to mount on an engine block (not shown) with each runner serving the air-fuel mixture intake port of one cylinder of the engine. Each plenum is also adapted to mount its own carburetor (not shown) in a well known manner.

Figure 2:
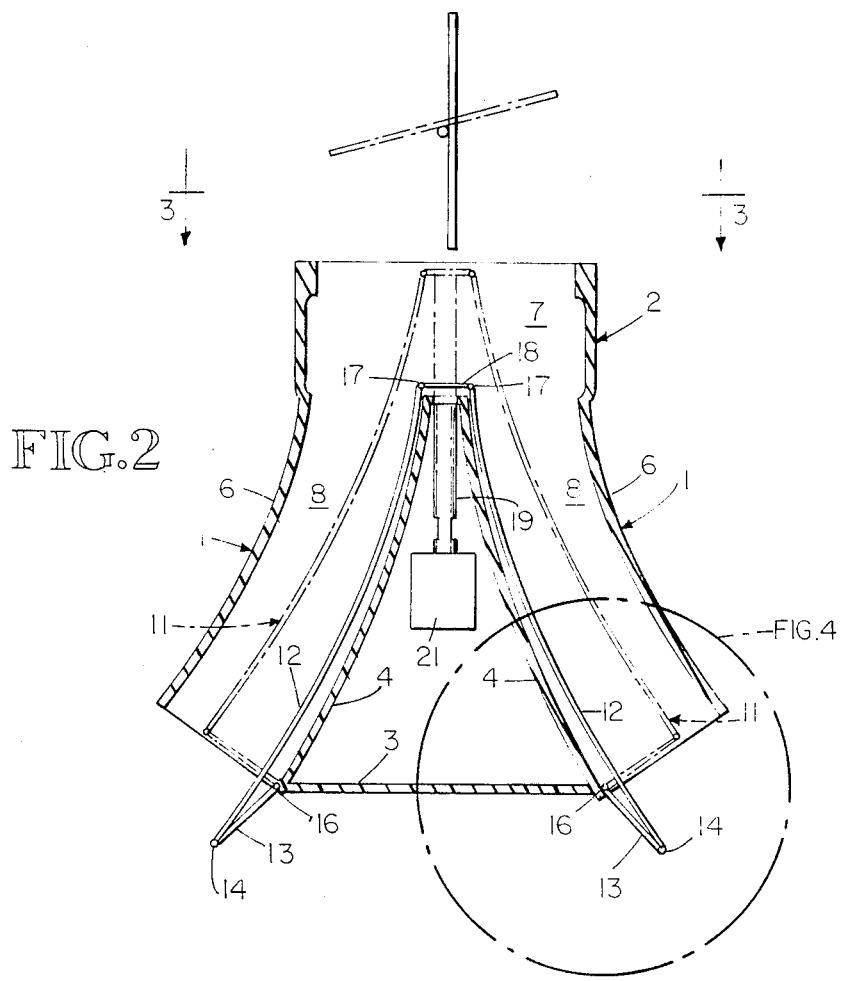
FIG. 2 is a cross-sectional view taken along lines 2—2 of FIG. 1.

As shown in cross-section in FIG. 2, each runner 1 is in essence a separate pipe which may be of any cross sectional configuration. For ease of understanding, the runners 1 as illustrated in FIGS. 2 and 3 will be understood to have a substantially rectangular cross section. Each runner will be understood to include an inner fixed floor wall 4, an opposite outside wall 6, as viewed in FIGS. 2 and 4, and connecting side walls. The manifold walls are rigid, usually being fabricated in the form of a metal casting. This arrangement provides for a common volumetric area or plenum chamber 7 in communication directly with the associated carburetor and each of the four runner passages 8. Air-fuel mixture from the carburetor is supplied in a direct and uniform flow, equally to each cylinder via the runner passages 8. A throttle valve indicated schematically at 9 in FIG. 2 is included in the carburetor for controlling and varying the amount of air-fuel mixture entering the plenum chamber, runners and cylinder intake ports.

Referring to FIGS. 2 and 4, the flow control system includes a movable two-part articulated wall member indicated generally at 11, comprising the movable runner floor 12 and the end panel 13. The movable floor member 12 may be curved longitudinally as illustrated or otherwise configured so as to substantially conform to the curvature of the fixed runner floor 4 in the retracted position shown in full lines in FIGS. 2 and 4. Likewise, if desired, the movable member 12 may be transversely curved or otherwise configured to substantially conform to the surface of the wall 4. The end panel 13 is connected at one of its ends to the bottom end of floor panel 12 by means of a hinge connection 14 and is connected at its other end to the bottom or down stream end of the fixed runner floor 4 as at 16. As seen in FIGS. 2 and 3, each runner 1 of the manifold is provided with an identical articulated wall member 11.

Each of the movable floor members 12 is hingedly connected at 17 to a common carrier plate or actuator plate 18. Referring to FIGS. 2 and 3, the actuator plate 18 is located in the bottom area of the plenum 7 adjacent the top ends of the runner passages 8. As illustrated by the dotted line position of the floor 12 and end panel 13 in FIGS. 2 and 4, raising and lowering of the actuator plate 18 serves to move the floor members 12 toward the outside walls 6 thereby decreasing the effective cross-sectional area of each runner. Simultaneously the effective volume of the plenum 2 is decreased by raising the actuator plate 18. The effect of moving the members 12 toward the fixed walls 6 is to lengthen the runner as the members 12 move upwardly into the plenum area. The hinged end plates 13 serve to produce uniform movement of the bottom ends of the members 13 to maintain substantial parallelism between the walls 12 and 6.

Movement of actuator plate 18 is controlled by the vertical actuator shaft 19 in the present embodiment. The shaft 19 passes through a suitable opening in the floor of the plenum 2 and may be controlled by motor means such as the vacuum motor illustrated schematically at 21. It will be understood that the unit 21 may be any conventional vacuum motor operable in a well known manner by the vacuum pressure in the carburetor or cylinders. Alternatively the actuator shaft 19 may be operated responsive to a computer controlled actuator of any type according to engine speed or vacuum pressure It is to be noted that the movable wall members 12 and 13 in the present embodiment are illustrated as having only close clearances with respect to the side walls of the runners It has been discovered in practice that this relationship is sufficient to reduce the effective cross-sectional flow area of the runners. It is believed that sufficient barrier is formed between the essentially dead air space or non-flow area behind the movable wall member and the flow area to accomplish the desired reduction in the effective cross-sectional flow area. The same observation applies with respect to the actuator plate 18 and the effective plenum volume. It would be possible, of course to provide a flexible seal between the movable members and the fixed walls to prevent flow of air across those boundaries. The results in any case is deemed to be a matter of degree.

Figure 6:
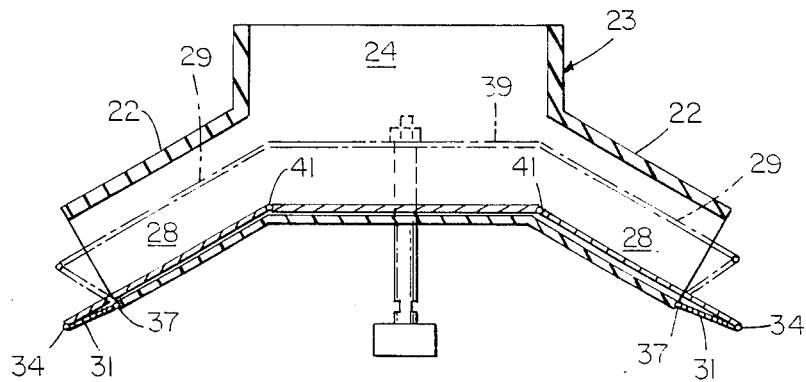
FIG. 6 is a cross-sectional view taken along lines 6—6 of FIG. 5.

FIGS. 5 and 6 illustrate an embodiment of the invention adapted to a manifold of a single carburetor V-8 engine of a somewhat different design which may be termed an "X" configuration. In this embodiment the four runners 22 are each divided into two runner passages connecting the cylinder ports of the engine to a single plenum 23 having a plenum chamber 24. The plenum 23 is, of course designed to mount a carburetor and the base 26 is adapted to be mounted on an engine block (not shown). As seen in FIG. 5, the divided runners 22 extend from the corners of a rectangular base to form the "X" plan configuration with each runner being divided into a first or outside runner passage 27 and an inside runner passage 28. With this configuration it may be seen that the outside runner 27 is slightly longer than the inside runner 28. For simplification, FIG. 6 is taken along lines 6—6 of FIG. 5 in a manner so as to depict only two inside runner passages 28 in a single view with the understanding that, except for runner length, the structure and principles of operation of the flow control devices are identical in all runners.

As in the instance of the FIGS. 1–4 embodiment the flow control system includes movable two-part articulated wall members. Referring to FIG. 6, each runner passage 27 and 28 is provided with a movable runner floor 29 and an end panel 31. The end panels 31 are hinged at one end to the associated floor panels by means of hinge connections 34. The opposite ends of the end plates 31 are connected to the fixed runner floors by means of the hinges 37.

A common connector or actuator plate 39 is located on the floor of the plenum chamber 24 with each movable member 29 being connected to the actuator plate at 41. As previously described, raising the actuator plate serves to simultaneously move, in this embodiment, all of the floor members 29 toward and away from the fixed runner walls as shown in dotted lines in FIG. 6 thereby decreasing the effective cross-sectional area of the associated runner passage. The effect on plenum volume and runner length is that described with relation to the FIGS. 1–4 embodiment. Control of the actuator plate 39 may be accomplished by the vertical actuator shaft 43 in the same manner as previously described for the actuator shaft 19 in FIG. 2.

Although the present invention has been described and illustrated with respect to specific embodiments thereof, it will be apparent to those skilled in the art that modifications to the structures disclosed may be made without departing from the spirit of the invention or from the scope of the appended claims.

What is claimed is:

1. In combination with a runner for an internal combustion engine intake manifold, said runner comprising a gas flow passage defined by fixed walls extending along the gas flow path, gas flow control apparatus comprising;
    an elongated movable wall member extending in substantial face-to-face relation with one of said fixed walls,
    means mounting said movable wall member for movement longitudinally in said passage to increase and decrease the effective length of the passage and simultaneously toward and away from said one fixed wall to increase and decrease the effective transverse cross-sectional flow area of said passage, and
    actuator means for adjusting and maintaining said movable wall member in a given position of adjustment.

2. The combination of claim 1 wherein;
    said runner has an upstream end relative to the direction of gas flow connected to a source of combustion gas and a downstream end connected to the intake port of the engine,
    said mounting means includes a rigid link pivotally connecting one end of said movable wall member to the associated fixed runner wall adjacent the downstream end thereof,
    said rigid link moving the downstream end of the movable wall member toward and away from the associated fixed wall upon longitudinal movement thereof, and
    means pivotally connecting the other end of said movable wall member to said actuator means for longitudinal adjustment.

3. The combination of claim 2 wherein said manifold includes a plenum chamber and a plurality of said runners having the upstream ends thereof opening into said plenum, each said runner including a movable wall member and mounting means therefor, said actuator means comprising;
    a connector plate located in said plenum chamber pivotally connected to each said movable wall members, and
    motor means coupled to said connector plate for moving said plate and said movable wall members in unison,
    whereby the displacement of said connector plate and the associated upstream ends of said movable wall members increases and decreases the effective plenum volume.

4. The combination of claim 3 wherein said motor means includes means for converting variations in intake manifold vacuum pressure to movement of said movable wall members to decrease the effective runner passage cross-sectional flow area and increase the effective runner length upon increased manifold vacuum pressure.

5. In an intake manifold for an internal combustion engine, said manifold including at least one intake runner having one end thereof connected to a source of combustion gas and the other end connected to the intake port of the engine and adapted to conduct combustion gas from said source to said intake port, said runner being defined by fixed walls extending along the path of gas flow, gas flow control apparatus comprising;
    a two-part articulated movable wall including an elongated wall member and an end panel,
    said movable wall member being mounted to extend along the length of one of said fixed walls in substantial face-to-face relation thereto,
    said end panel being pivotally connected at one end to one end of said movable wall member and at the other end to the fixed wall adjacent the intake port, and
    actuator means connected to the other end of said movable wall for moving said movable wall longitudinally in said runner in a direction toward and away from said intake port, whereby pivoting of said end panel relative to said fixed wall serves to move said one end of said movable wall member in a transverse direction toward and away from said fixed wall to reduce the effective transverse cross-sectional flow area of said runner passage and longitudinal movement of said movable wall serves to simultaneously increase and decrease the effective length of said runner passage.

6. The apparatus of claim 5 wherein said manifold includes a plenum chamber connected to said source of combustion gas, said plenum including a plenum wall with a plurality of said intake runners connected therewith, said actuator means comprising;

a connector plate mounted on said plenum wall and pivotally connected to each said movable runner walls, and motor means connected to said connector plate to move said plate toward and away form said plenum wall to move said movable runner walls in unison in a longitudinal direction relative to said runner passages, whereby displacement of said connector plate and the ends of said movable runner walls increases and decreases the effective plenum volume.

7. The apparatus of claim 6 including;

an actuator shaft connected to said connector plate and to said motor means, and mounting means for mounting said actuator shaft in said plenum wall for reciprocating drive motion for moving said plate toward and away from said plenum wall.

8. The apparatus of claim 7 wherein said motor means includes means for converting variations in intake manifold vacuum pressure to movement of said wall members to decrease the effective runner passage cross-sectional area, effective plenum volume and to increase the effective runner length upon increased manifold vacuum pressure.

* * * * *